(12) United States Patent
Girardi et al.

(10) Patent No.: US 6,488,249 B1
(45) Date of Patent: Dec. 3, 2002

(54) SYSTEM FOR ADJUSTING THE LONGITUDINAL POSITION AND MAINTAINING THEREIN A MOTOR VEHICLE SEAT

(75) Inventors: Philippe Girardi, Groslay (FR); Marc Amerigo, Boulogne Billancourt (FR)

(73) Assignee: Renault, Boulogne Billancourt (FR)

(*) Notice: Subject to any disclaimer, the term of this patent is extended or adjusted under 35 U.S.C. 154(b) by 0 days.

(21) Appl. No.: 09/403,767
(22) PCT Filed: Apr. 24, 1998
(86) PCT No.: PCT/FR98/00820
  § 371 (c)(1),
  (2), (4) Date: Dec. 13, 1999
(87) PCT Pub. No.: WO98/49027
  PCT Pub. Date: Nov. 5, 1998

(30) Foreign Application Priority Data
  Apr. 30, 1997 (FR) .............................................. 97 05344

(51) Int. Cl.⁷ ............................................... F16M 13/00
(52) U.S. Cl. .................... 248/429; 248/424; 296/65.03; 296/65.14
(58) Field of Search ................................ 248/424, 429, 248/408, 423, 501, 503.1; 297/311, 344.11, 344.1; 296/65.03, 65.14

(56) References Cited

U.S. PATENT DOCUMENTS

| | | | | |
|---|---|---|---|---|
| 660,651 A | * | 10/1900 | Olmsted | 248/503.1 |
| 2,589,922 A | * | 3/1952 | Bowman | 248/502 |
| 3,486,204 A | * | 12/1969 | Hurtner | 248/501 |
| 4,773,693 A | * | 9/1988 | Premji | 296/65.1 |
| 5,106,144 A | * | 4/1992 | Hayakawa et al. | 296/68.1 |
| 5,330,245 A | * | 7/1994 | Boisset | 296/65.1 |
| 5,372,398 A | * | 12/1994 | Aneiros et al. | 296/65.1 |
| 5,775,763 A | * | 7/1998 | Glinter et al. | 296/65.1 |
| 5,921,606 A | * | 7/1999 | Moradell | 296/65.03 |

OTHER PUBLICATIONS

U.S. patent application Ser. No. 09/403,764, filed Dec. 15, 1999, pending.
U.S. patent application Ser. No. 09/403,767, filed Dec. 13, 1999, pending.

* cited by examiner

*Primary Examiner*—Korie Chan
*Assistant Examiner*—Gwendolyn Baxter
(74) *Attorney, Agent, or Firm*—Oblon, Spivak, McClelland, Maier & Neustadt, P.C.

(57) ABSTRACT

An adjustment system for a seat including at least one foot adapted to be mounted to the seat, and a slideway having a longitudinal slot configured to receive the foot in a sliding manner. The foot has an expandable mechanism with locking members having symmetric and opposed action relative to a central longitudinal plane. The slideway has a plurality of locking portions. The expandable mechanism has a first position in which the locking members are oriented with a first transverse width such that the expandable mechanism can be introduced into and extracted from the slot. The mechanism has a second position where the locking members have a second transverse width such that a locking member is engaged to a locking portion, thereby immobilizing the foot relative to the slideway. And, the expandable mechanism has an intermediate position where the locking members have a third transverse width such that the locking members are disengaged from the locking portions to permit longitudinal displacement of the foot relative to the slideway, and such that the locking members are retained within the slot.

8 Claims, 7 Drawing Sheets

SYSTEM FOR ADJUSTING THE LONGITUDINAL POSITION AND MAINTAINING THEREIN A MOTOR VEHICLE SEAT

The invention proposes a system for adjusting the longitudinal position of a subassembly, especially a seat, on the horizontal floor of the passenger compartment of a motor vehicle and for blocking the same in adjusted position.

The invention relates more particularly to a system for outfitting the interior of a motor vehicle of the "one-compartment" type, which must embody flexible outfitting capabilities, and especially great modularity, with regard to both the number of removable seats or subassemblies provided in the passenger compartment, and the number of positions that these subassemblies can occupy.

According to a first known design, it has already been suggested that a plurality of series of fastening points be provided on the vehicle floor, each of which series, preferably having four fastening points for the four feet of the seat or of the subassembly, determines a mounting and fixing position.

A system for increasing the modularity of the outfitting of the passenger compartment has already been suggested. Such a system is described and illustrated in, for example, European Patent Application A 0615879, wherein the horizontal floor of the passenger compartment is equipped with at least two parallel rails or slideways which accommodate, in longitudinal sliding manner, guide members in the form of slides, also called shuttles, which guide the longitudinal displacements of the seat and which make it possible to ensure locking of the seat in adjusted longitudinal position, the seat having substantially vertical orienting feet whose lower ends contain means of known design for fastening the seat to the slides or shuttles.

This embodiment permits the modularity to be increased and also permits the longitudinal position of a seat to be adjusted while conserving its orientation and fastening, by shifting the slides.

However, this design relies on using as many pairs of slides or shuttles as correspond to the number of seats to be mounted and, if it is not desired that the slides be visible in the passenger compartment, they must be fitted in the bottom of slideways embedded in the floor, thus making it difficult to fasten a seat to the upper faces of the slides, in that these are not visible and are masked by brush-like means which partly block the central longitudinal slot of the rail-shaped slideway.

The objective of the invention is to propose a new design of an adjustment system of the type mentioned hereinabove, which design permits these disadvantages to be remedied.

Toward this objective, the invention proposes a system characterized in that the lower end of at least one of the feet is equipped with a movable expandable mechanism controlled between:

a first position, defined as engagement or disengagement position, in which two mechanism-locking members with symmetric and opposed action relative to a central longitudinal plane are in inwardly retracted position, in which their transverse width permits vertical introduction or extraction of the mechanism in the slideway via a central longitudinal slot thereof, bounded by two longitudinal and parallel upper rims of the slideway;

and a second extreme position, defined as locking position, in which each of the two locking members is extended transversely outward to face an internal portion of one of the upper rims of the slot, with which they cooperate in fastening, thus vertically and longitudinally immobilizing the foot relative to the slideway; while passing through at least one intermediate position, defined as adjustment position, in which each of the two locking members is extended transversely outward to face the said internal portion of one of the upper rims of the slot, thus vertically retaining the foot relative to the slideway and permitting longitudinal displacements of the foot relative to the slideway.

According to other characteristics of the invention:

the two locking members are two locking levers, each of which is mounted to pivot, in the vicinity of its lower end, around a longitudinal hinge pin, which is supported by the foot and the active upper part of which has a profile complementary to the profile of the internal portion of a rim of the slot of the slideway which faces it;

the upper face of the upper end of each lever is formed into a hook, which cooperates with the lower fastening face of the said internal portion;

the lower fastening face of the said internal portion is provided with a series of longitudinally distributed notches, each of which constitutes a locking catch capable of accommodating the lower hook-shaped end of a locking lever;

the locking levers are biased resiliently toward their extreme locking position;

the lower ends of the two levers are mounted pivotably around a single lower longitudinal pivot which is mounted to slide in a lower central vertical opening and on which there acts a first maneuvering member, and the mechanism has two maneuvering rods, with symmetric and opposed action, each of which is pivoted at its upper end around a single upper longitudinal pivot which is mounted to slide in an upper central vertical opening and on which there acts a second maneuvering member, and each of which is pivoted at its lower end on a locking lever, near the upper end of the latter.

the subassembly is a motor vehicle seat.

Other characteristics and advantages of the invention will become clear upon reading the detailed description hereinafter, which can be understood by referring to the attached drawings, wherein:

FIG. 1 is a perspective schematic view illustrating a subassembly associated with two parallel slideways for adjustment of the longitudinal position and for blocking of the subassembly;

FIG. 2 a perspective detail view which partly illustrates a segment of a slideway according to the teachings of the invention;

FIG. 3 an end view, partly in transverse section, on which the lower part of a foot is illustrated in association with a slideway, the whole being represented during a phase of engagement of the foot in the slideway;

Figure 1:
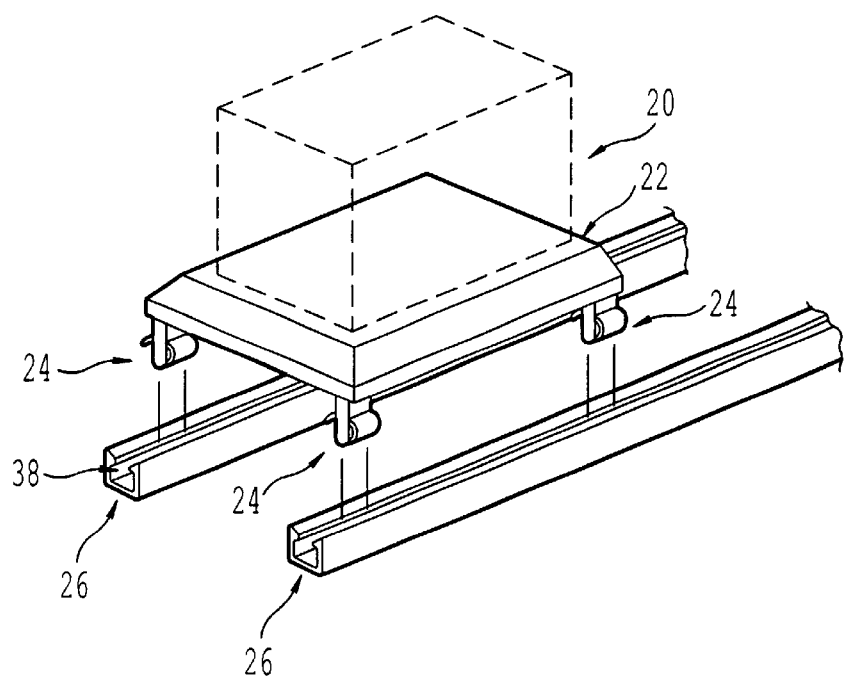

FIG. 1 shows a subassembly 20 such as a removable motor vehicle seat, provided with a rigid structure or chassis, a lower part 22 of which is equipped at its four opposite corners with four feet 24 having substantially vertical orientation.

Each of the two pairs of aligned feet is designed such that the lower vertical ends of feet 24 are accommodated inside two slideways, or longitudinal and parallel slides 26, which are provided to be fixed on the horizontal floor of a motor vehicle (not shown), for example on the upper face thereof, or alternatively to be lodged in longitudinal grooves of the floor.

Figure 2:
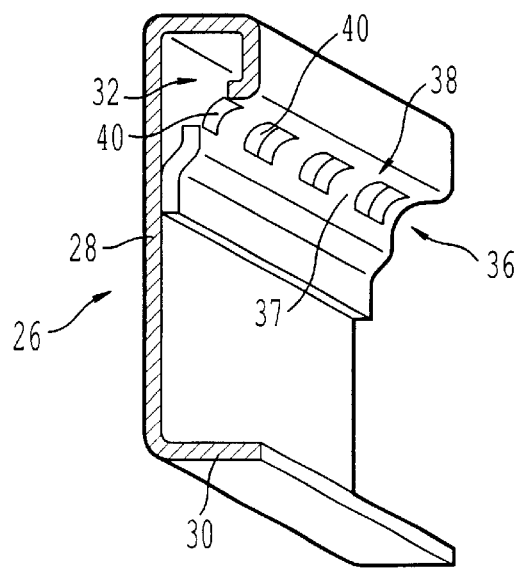
Figure 3:
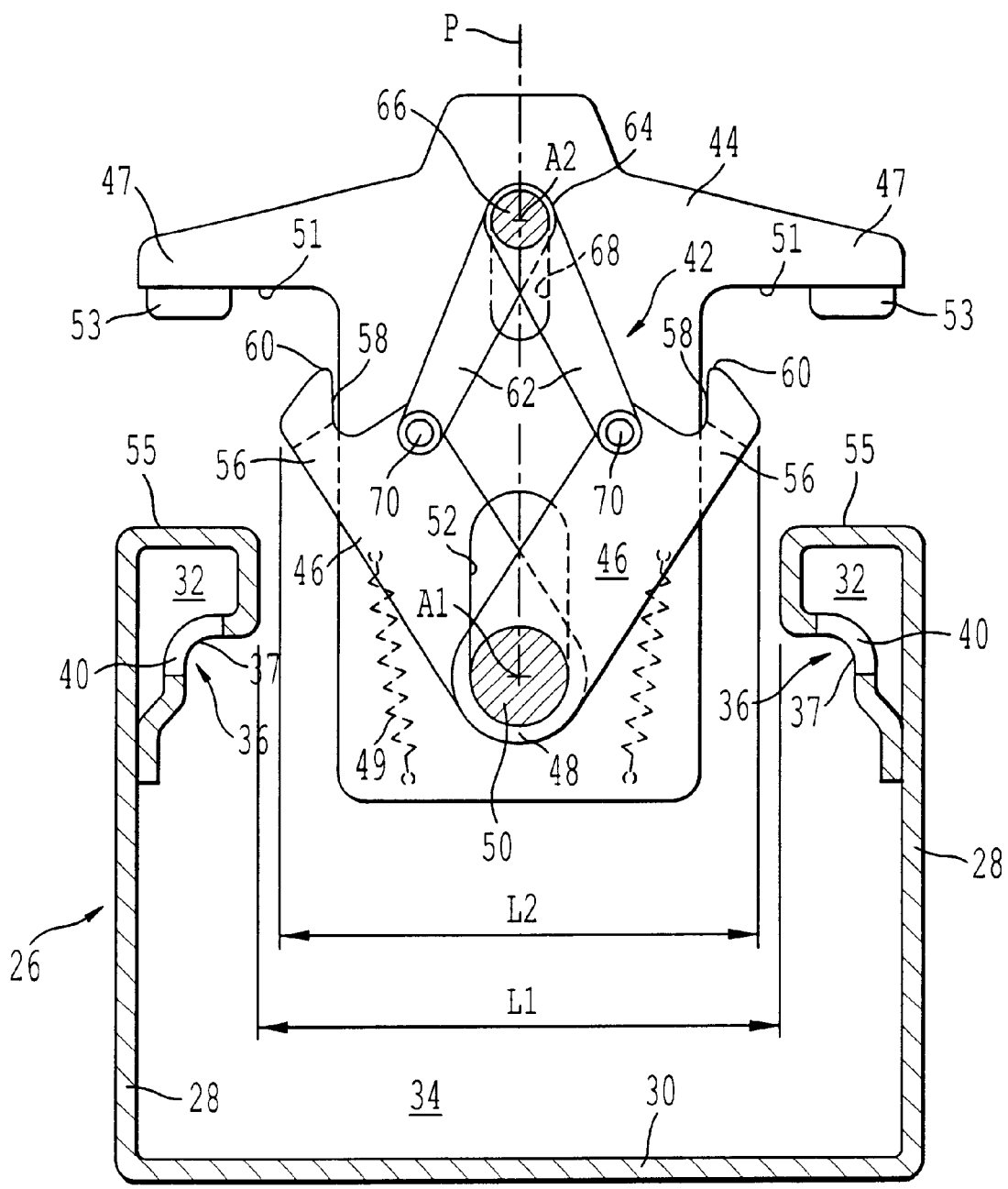

According to the teachings of the invention, as can be seen in particular in FIGS. 2 and 3, each of the two slideways 26 has longitudinal design symmetry relative to a central longitudinal vertical plane P, and each is made in this case in the form of a longitudinal section of cut and bent sheet metal.

Each slideway, in transverse section, is substantially U-shaped and open upwards.

Slideway 26 substantially comprises two opposite side flanges 28, which are interconnected at their lower extremities by a flat horizontal bottom 30.

Flanges 28 run parallel to each other, and have vertical orientation.

At its upper extremity, each side flange 28 is prolonged transversely inward by a sheet metal part bent over inward and downward which constitutes an upper rim 32, in the form of a box, of slideway 26, the upper faces 33 of which are flat and the lower faces of which constitute the internal portions 36 of upper rims 32 within the meaning of the invention.

Upper rims 32 define between them a longitudinal central slot 38 of transverse width L1 in slideway 26.

As can be seen in particular in FIG. 2, each of the upper rims 32 is provided with a series of notches 40 distributed longitudinally at regular intervals along the internal portion 36 of rim 32, each forming a blocking and locking catch, as will be explained hereinafter.

Referring to FIGS. 1 to 8, there will now be described the expandable locking mechanism 42, associated with lower end 44 of a foot 24, which is designed to cooperate with the slideway 26.

Mechanism 42 substantially comprises two locking levers 46, which extend substantially vertically and each of which is pivoted, via its lower end 48 and around a longitudinal pin A1, on a lower central pivot 50 which is accommodated slidingly in a lower opening 52 which is central and which extends vertically into the lower portion of the lower part 44 of the foot.

Each locking lever 46 is provided with an active upper part 56, upper face 58 of which is formed as a hook with shape complementary to the profile of lower face 37 of internal portion 36 of facing upper rim 32 of slideway 26.

As will be explained hereinafter, the profile of hook-shaped upper face 58 is also configured such that free tip 60 of each hook is capable of penetrating at least partly into a notch 40.

The lower part 44 comprises two flanges 47 the lower faces 51 of which support runners 53 which are capable of becoming stopped vertically, then sliding longitudinally, on portions of upper horizontal plane surfaces 55 facing box-like upper rims 32 of slideway 26.

For the control of pivoting movements of locking lever 46 around pins A1 thereof, a pair of rods or linkages 62, is provided.

Each of the control rods 62 is pivoted at its upper end 64 around a longitudinal pin A2, on an upper central pivot 66 which is accommodated slidingly in an upper opening 68 which is central and which extends vertically into the upper portion of the lower part 44 of the foot.

The lower end 70 of each control rod is pivoted, around a longitudinal pin, on a locking lever 46 in the vicinity of the upper active end 56 of the latter.

Figure 8:
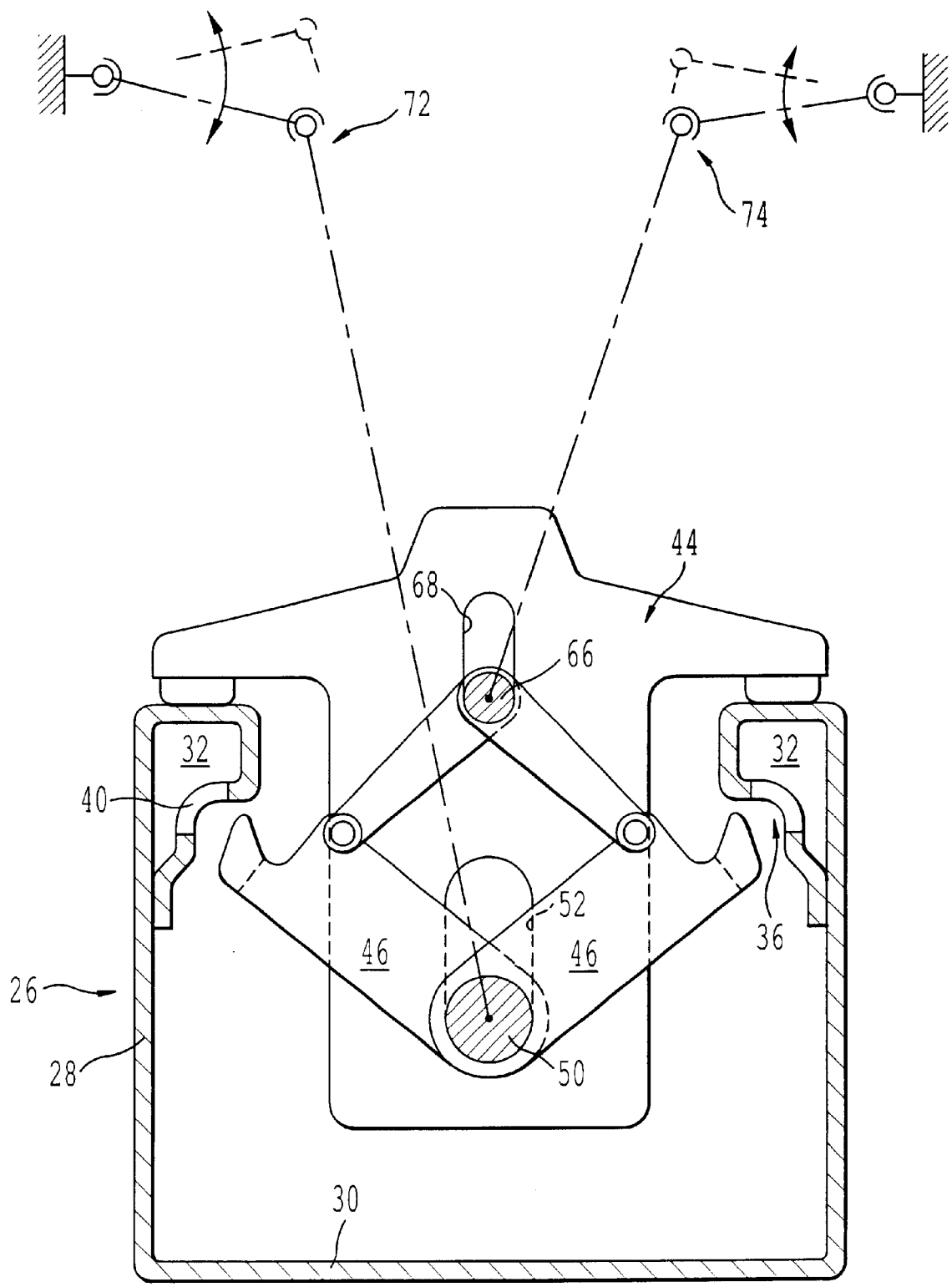
FIG. 8 is a diagram illustrating the two maneuvering members and their cooperation with the expandable mechanism.

For the maneuvering of expandable mechanism 42, there is provided a first maneuvering member or mechanism 72 which is connected to lower pivot 50 to control the vertical sliding displacements of the latter in lower opening 52 between maximum lower and upper positions defined by the lower and upper ends of the opening (see FIG. 8).

For the maneuvering of expandable mechanism 42, there also is provided a second maneuvering member or mechanism 74 which is connected to upper pivot 66 to control the vertical sliding displacements of the latter in upper opening 68 between the maximum lower and upper positions defined by the lower and upper ends of the opening.

Referring to FIGS. 3 to 6, the operation of the adjustment and locking device will now be described.

During the phase of engagement of expandable mechanism 42 with interior 34 of slideway 26, illustrated in FIG. 3, lower pivot 50 is in extreme lower position and upper pivot 66 is in extreme higher position in order to bring about a retraction of expandable mechanism 42, the maximum transverse width L2 of the mechanism being less than the width L1 of the slot 38 so as to permit vertical downward introduction of the levers 46 into slideway 26.

Figure 4:
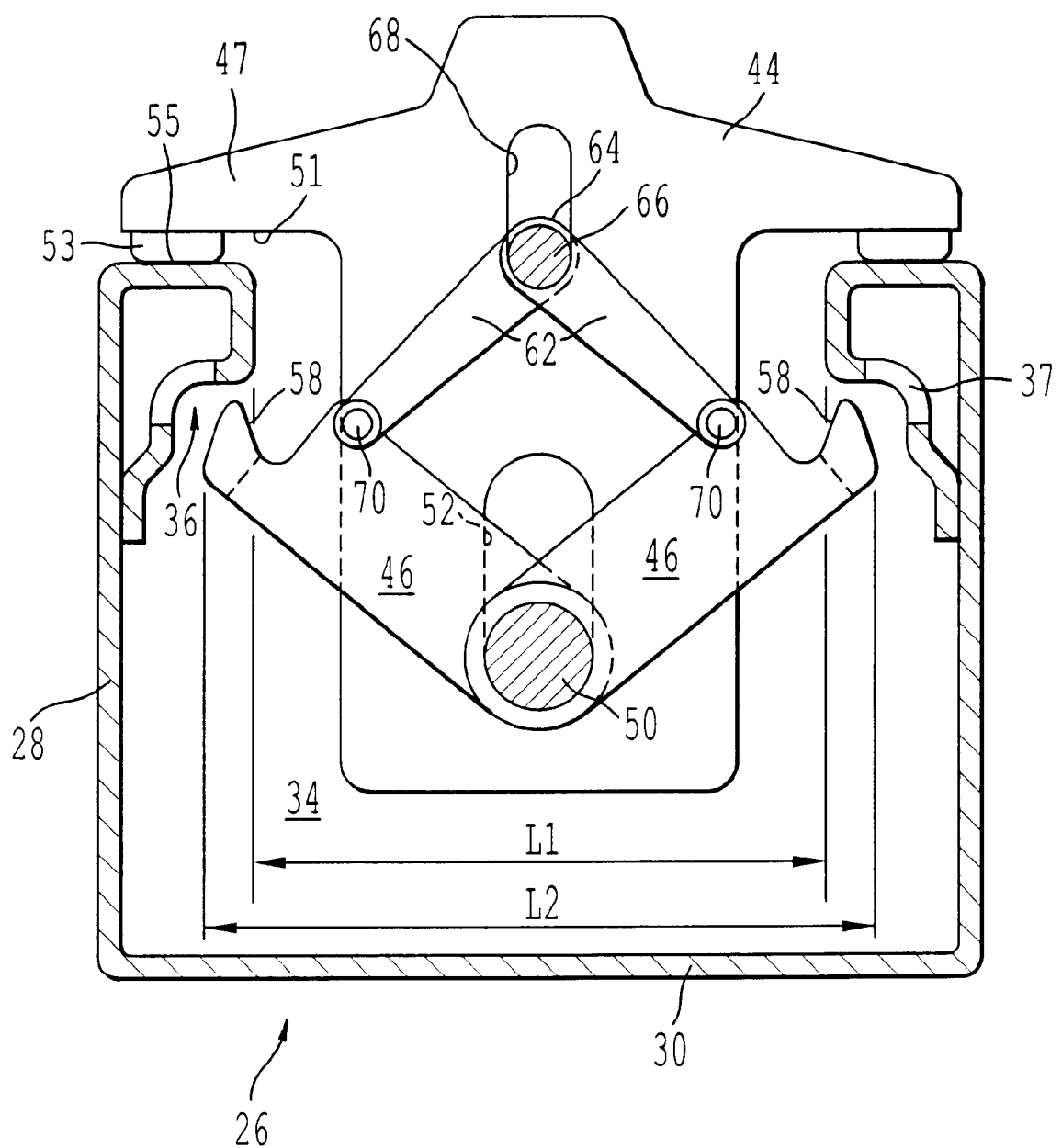
FIG. 4 is a view similar to that of FIG. 3, in which the foot is illustrated in adjustment position.

From the position illustrated in FIG. 3, engagement continues until the runners 53 become braced on portions of horizontal surfaces 55 as illustrated in FIG. 4.

At this height, under the action of springs 49 which resiliently bias the levers in mutual distancing of the upper active ends 56 thereof and because of the slackening of the second maneuvering member 74 which permits the upper pivot 66 to occupy its extreme lower position, the levers 46 spread apart transversely outward.

In this adjustment position illustrated in FIG. 4, the upper ends 56 in the form of hooks 58, 60 of levers 46 are extended to face lower faces 37 of the internal portions 36 of the box-like upper rims of slideway 26, and it thus is impossible to extract mechanism 42 vertically from slideway 26; in other words, foot 24 is retained vertically upward relative to slideway 26.

The height of hooks 58, 60, or in other words the vertical clearance that exists between their tips 60 and lower faces 37, is determined by the action of runners 53 becoming stopped against the horizontal surface portions.

In the position illustrated in FIG. 4, it is possible to adjust the longitudinal position of foot 24 relative to slideway 26.

Figure 5:
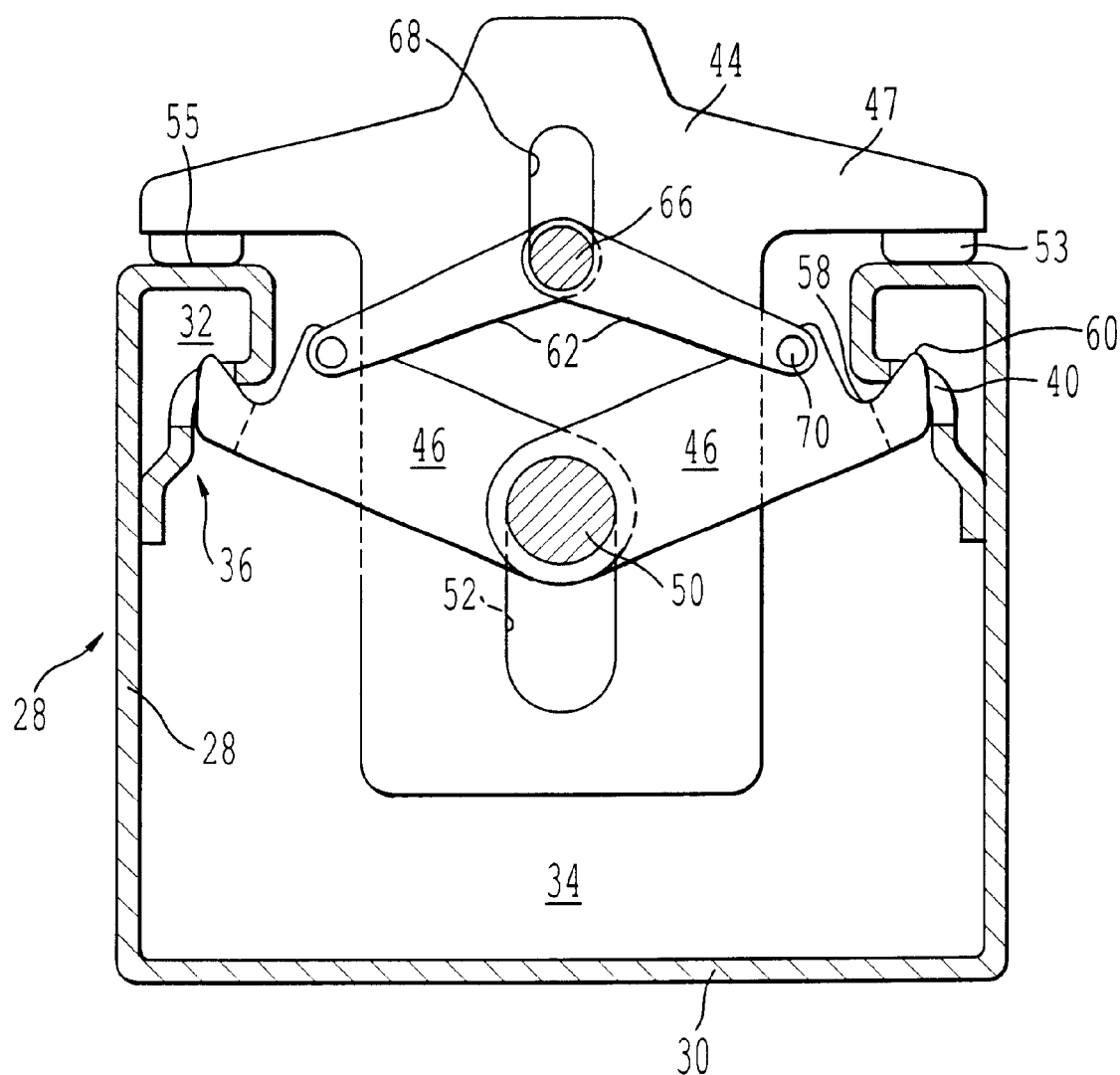
FIG. 5 is a view similar to that of FIG. 4, in which the foot is illustrated in locked position.
Figure 6:
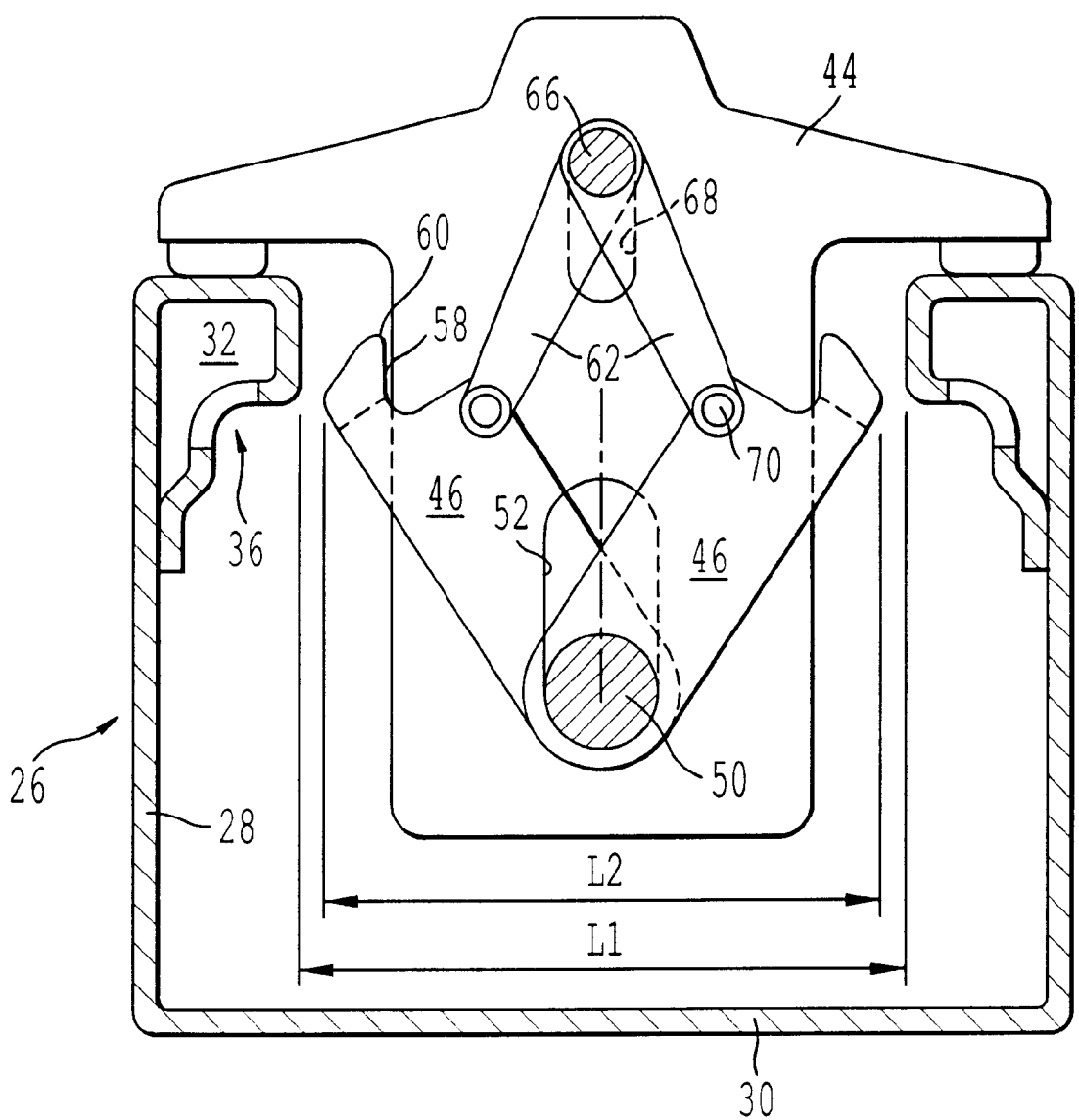
FIG. 6 is a view similar to that of FIG. 3, in which the foot is illustrated during its phase of disengagement from the slideway.
Figure 7:
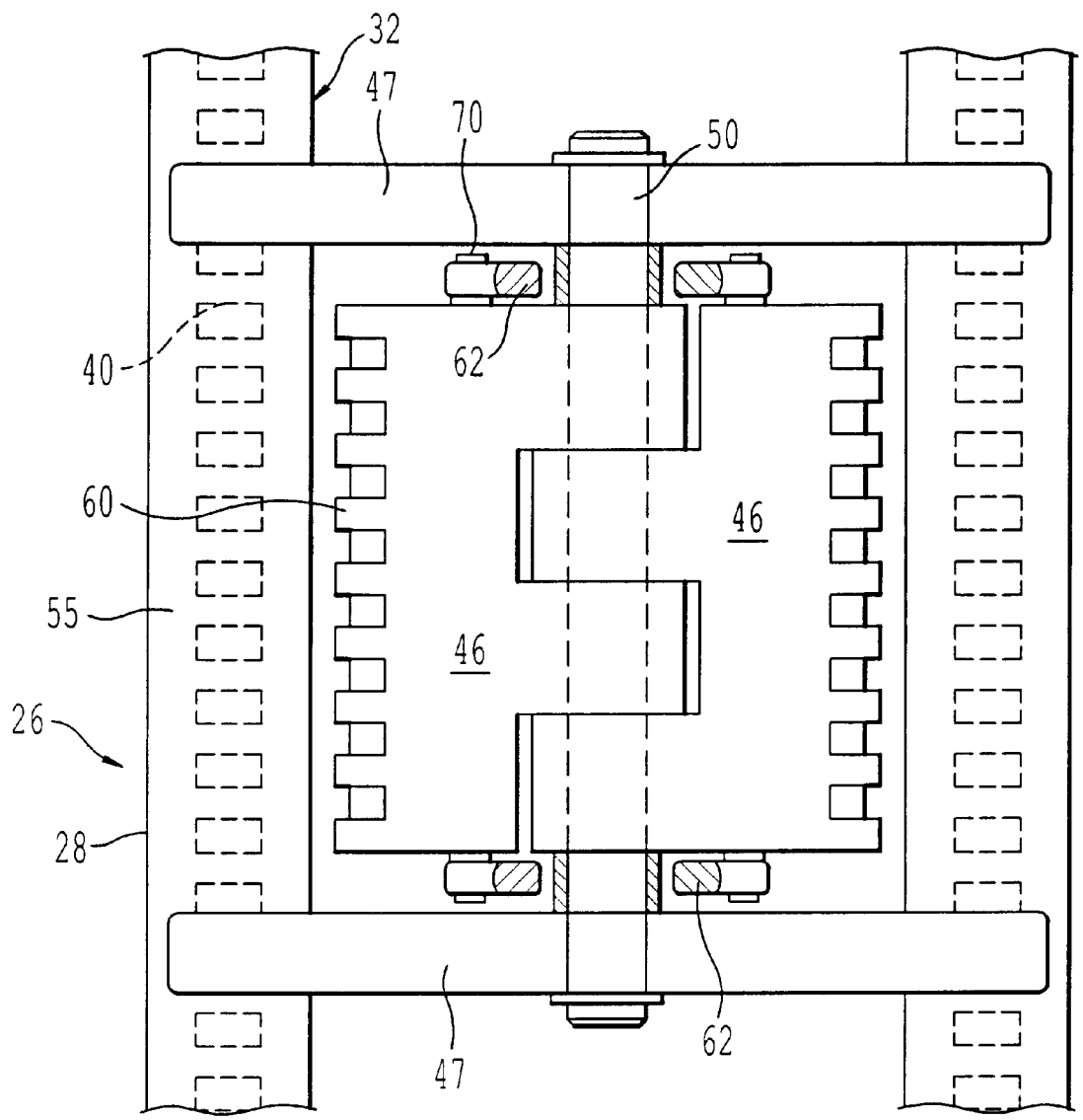
FIG. 7 is a view from above, in partial section, of the system illustrated with the enable mechanism in retracted position.

To immobilize foot 24 longitudinally relative to slideway 26, by starting from the adjustment position illustrated in FIG. 4, the user acts on the first maneuvering member 72 to cause the raising of the lower pivot 50 toward its extreme upper position, illustrated in FIG. 5.

The vertical upward travel of lower pivot 50 causes a vertical upward displacement of levers 46 and a slight simultaneous pivoting of levers 46.

This vertical travel causes penetration of hooks 58, 60 into notches 40 of upper rims 32, whence the longitudinal immobilization of foot 24 relative to slideway 26.

From the locked position illustrated in FIG. 5, in view of readjusting the longitudinal position of the seat, it is possible to revert to the adjustment position of FIG. 4 by releasing control 72.

To unlock the mechanism in view of permitting disengagement thereof from slideway 26, by a vertical extraction movement, the user acts on the first maneuvering member 72 in order to cause the lower pivot to descend again to its extreme low position; in other words, the expandable mechanism is again in its contracted state identical to that illustrated in FIG. 3 in which the maximum transverse width L2 of mechanism 42 is less than the width L1 of slot 38 so as to allow its extraction from slideway 26.

As a function of the application and, for example, depending on whether subassembly 20 comprises a seat that must be firmly secured or else an accessory such as a shelf, one or more feet 24, such as two front feet or two rear feet, may be constructed according to the teachings of the invention.

What is claimed is:

1. A system for adjusting a longitudinal position of a subassembly on a horizontal floor of a passenger compartment of a motor vehicle and for blocking same in adjusted position, said system comprising the subassembly having feet and two parallel slideways which accommodate, in longitudinal sliding manner, members for guiding longitudinal displacements and for locking the feet of the subassembly, which is of substantially vertical orientation, in adjusted position, characterized in that the lower end of at least one of the feet is equipped with a movable expandable mechanism controlled between:

a first position, defined as engagement or disengagement position, in which two locking members for mechanism, with symmetric and opposed action relative to a central longitudinal plane, are in inwardly retracted position, in which their transverse width permits vertical introduction or extraction of the mechanism in the slideway via a central longitudinal slot thereof, bounded by two longitudinal and parallel upper rims of the slideway;

and a second extreme position, defined as locking position, in which each of the two locking members is extended transversely outward to face an internal portion of one of the upper rims of the slot, with which they cooperate in fastening, thus vertically and longitudinally immobilizing a foot relative to the slideway;

while passing through at least one intermediate position, defined as adjustment position, in which each of the two locking members is extended transversely outward to face said internal portion of one of the upper rims of the slot, to retain the foot vertically relative to the slideway and permit longitudinal displacements of the foot relative to the slideway.

2. A system according to claim 1, characterized in that the two locking members are two locking levers, each of which is mounted to pivot, at a lower end thereof, around a longitudinal hinge pin, which is supported by the foot and the active upper part of which has a profile complementary to a profile of the internal portion of a rim of the slot of the slideway which faces the active upper part.

3. A system according to claim 2, characterized in that an upper face of the lower end of each lever is formed into a hook, which cooperates with a lower fastening face of said internal portion.

4. A system according to claim 3, characterized in that the lower fastening face of said internal portion is provided with a series of longitudinally distributed notches, each of which constitutes a locking catch capable of accommodating a lower hook-shaped end of a locking lever.

5. A system according to claim 2, characterized in that the locking levers are biased resiliently toward said extreme locking position.

6. System according to claim 2, characterized in that the lower ends of the two levers are mounted pivotably around a single lower longitudinal pivot which is mounted to slide in a lower central vertical opening and on which there acts a first maneuvering member, and in that the mechanism has two maneuvering rods, with symmetric and opposed action, each of which is pivoted at an upper end thereof around a single upper longitudinal pivot which is mounted slidingly in an upper central vertical opening and on which there acts a second maneuvering member, and each one of which is pivoted at a lower end thereof end on a locking lever, near the upper end of the locking lever.

7. System according to any one of the preceding claims, characterized in that the subassembly (20) is a motor vehicle seat.

8. An adjustment system for a seat, said adjustment system comprising:

a foot adapted to be mounted to the seat, said foot having an expandable mechanism with locking members having symmetric and opposed action relative to a central longitudinal plane; and a slideway having a longitudinal slot configured to receive said foot in a longitudinal sliding manner, said slideway having a plurality of locking portions, wherein:

said expandable mechanism has a first position in which said locking members are in an orientation with a first transverse width such that said expandable mechanism can be introduced into and extracted from said slot of said slideway, said expandable mechanism has a second position in which said locking members are in an orientation with a second transverse width such that at least one of said locking members is engaged to at least one of said plurality of locking portions of said slideway thereby immobilizing said foot relative to said slideway, and said expandable mechanism has an intermediate position in which said locking members are in an orientation with a third transverse width such that said locking members are disengaged from said locking portions in order to permit longitudinal displacement of said foot relative to said slideway, and such that said locking members are retained within said slot of said slideway.

* * * * *